US012638751B2

(12) United States Patent (10) Patent No.: US 12,638,751 B2
Sekizawa et al. (45) Date of Patent: May 26, 2026

(54) CAMERA

(71) Applicants:NIDEC PRECISION CORPORATION, Tokyo (JP); FUJIFILM CORPORATION, Tokyo (JP)

(72) Inventors: Koji Sekizawa, Tokyo (JP); Tomihiro Wakayama, Tokyo (JP); Yuichi Ozawa, Tokyo (JP); Hisashi Tasaka, Tokyo (JP)

(73) Assignees: NIDEC PRECISION CORPORATION, Tokyo (JP); FUJIFILM CORPORATION, Tokyo (JP)

( * ) Notice: Subject to any disclaimer, the term of this patent is extended or adjusted under 35 U.S.C. 154(b) by 79 days.

(21) Appl. No.: 18/418,346

(22) Filed: Jan. 22, 2024

(65) Prior Publication Data

US 2024/0248377 A1 Jul. 25, 2024

(30) Foreign Application Priority Data

Jan. 23, 2023 (JP) ................................. 2023-007755

(51) Int. Cl.
  *G03B 17/04* (2021.01)
  *G03B 5/02* (2021.01)
(52) U.S. Cl.
  CPC .............. *G03B 17/04* (2013.01); *G03B 5/02* (2013.01)
(58) Field of Classification Search
  CPC ............................................ G03B 17/04–045
  See application file for complete search history.

(56) References Cited

U.S. PATENT DOCUMENTS 5,878,295 A 3/1999 Katagiri et al.
6,393,218 B1 * 5/2002 Iwasaki .................. G03B 17/04
                                          396/79
(Continued)

FOREIGN PATENT DOCUMENTS

CN    214315377 U   9/2021
EP     4080276 A1  10/2022
(Continued)

OTHER PUBLICATIONS

Extended European Search Report in EP Application No. 24153036.9, dated Jun. 4, 2024. 7pp.
(Continued)

*Primary Examiner* — Leon W Rhodes, Jr.
(74) *Attorney, Agent, or Firm* — HAUPTMAN HAM, LLP

(57) ABSTRACT

A camera includes a lens barrel including a rotary cylinder and a key cylinder movable forward relative to a barrel portion in a frame from a position radially inside the barrel portion, and a linearly movable cylinder movable forward relative to the rotary cylinder and the key cylinder from a position radially inside the key cylinder. The camera includes a light shield having a rear extendable portion connected to the frame and a front extendable portion connected to the linearly movable cylinder. The rear extendable portion contracts in an optical axis direction in a retracted state and extends in the optical axis direction in a first photographing state and a second photographing state. The front extendable portion contracts in the optical axis direction in the retracted state and extends to have a length greater than or equal to its equilibrium length in the optical axis direction in the second photographing state.

6 Claims, 9 Drawing Sheets

(56)    References Cited

U.S. PATENT DOCUMENTS

2002/0110375  A1    8/2002  Takagi et al.
2023/0037456  A1    2/2023  Wakayama et al.

FOREIGN PATENT DOCUMENTS

JP          S58115733  U      8/1983
JP          S60242443  A      12/1985
JP          H09145976  A      6/1997

OTHER PUBLICATIONS

Office Action in EP Application No. 24153036.9, dated Nov. 20, 2025. 5pp.

* cited by examiner

CAMERA

RELATED APPLICATIONS

The present application claims priority to Japanese Application Number 2023-007755, filed Jan. 23, 2023, the disclosure of which is hereby incorporated by reference herein in its entirety.

BACKGROUND

Technical Field

The present invention relates to a camera, and particularly, to a camera including an extendable lens barrel.

Description of the Background

A known camera includes a lens barrel extension assembly for allowing a lens barrel to extend forward in an optical axis direction. In such a camera, the lens barrel is typically connected to a camera body with an extendable bellows to prevent entry of light and dust when the lens barrel extends forward. To perform short-distance photographing (macro photographing) in addition to normal photographing, the lens barrel is to extend further than for normal photographing. A known camera includes two foldable light shields connected in the optical axis direction to allow a lens barrel to extend by a longer distance (refer to, for example, Patent Literature 1).

In such known cameras, the connection between the two light shields is to be fixed to a movable part of the lens barrel using a fastener. Both the two light shields are foldable and extendable largely in a direction perpendicular to the optical axis direction to switch between the folded and unfolded states. Thus, downsizing the camera increases the likelihood of vignetting by causing one light shield in the folded state to be included in an image projected onto the photographic film.

CITATION LIST

Patent Literature

Patent Literature 1: WO 2021/125003

BRIEF SUMMARY

In response to the above issue, one or more aspects of the present invention are directed to a camera with a simple and inexpensive structure that reduces the likelihood of vignetting while preventing entry of light and dust.

In an aspect of the present invention, a camera with a simple and inexpensive structure reduces the likelihood of vignetting while preventing entry of light and dust. The camera includes a frame including a film compartment to contain a photographic film and a barrel portion extending from the film compartment in an optical axis direction, and a lens barrel movable in the optical axis direction inside the barrel portion. The lens barrel includes a rear lens barrel unit movable forward relative to the barrel portion from a position radially inside the barrel portion and a front lens barrel unit movable forward relative to the rear lens barrel unit from a position radially inside the rear lens barrel unit. The front lens barrel unit accommodates at least one lens. The camera further includes a light shield separate from the rear lens barrel unit and connecting the frame and the front lens barrel unit. The light shield includes a rear extendable portion connected to the frame and extendable from a contracting state in the optical axis direction, and a front extendable portion connected to the front lens barrel unit and extendable from a contracting state in the optical axis direction to be longer than an equilibrium length of the front extendable portion. The lens barrel is shiftable between a retracted state in which the rear lens barrel unit is accommodated radially inside the barrel portion and the front lens barrel unit is accommodated radially inside the rear lens barrel unit, a first photographing state in which the rear lens barrel unit extends forward relative to the barrel portion and the front lens barrel unit is accommodated radially inside the rear lens barrel unit, and a second photographing state in which the rear lens barrel unit extends forward relative to the barrel portion and the front lens barrel unit extends forward relative to the rear lens barrel unit. The rear extendable portion in the light shield contracts in the optical axis direction to have a first length in the optical axis direction in the retracted state and has a second length greater than the first length in the optical axis direction in the first photographing state and the second photographing state. The front extendable portion in the light shield contracts in the optical axis direction to have a third length in the optical axis direction in the retracted state and has a fourth length greater than the third length and greater than or equal to the equilibrium length in the optical axis direction in the second photographing state.

DETAILED DESCRIPTION

Figure 1:
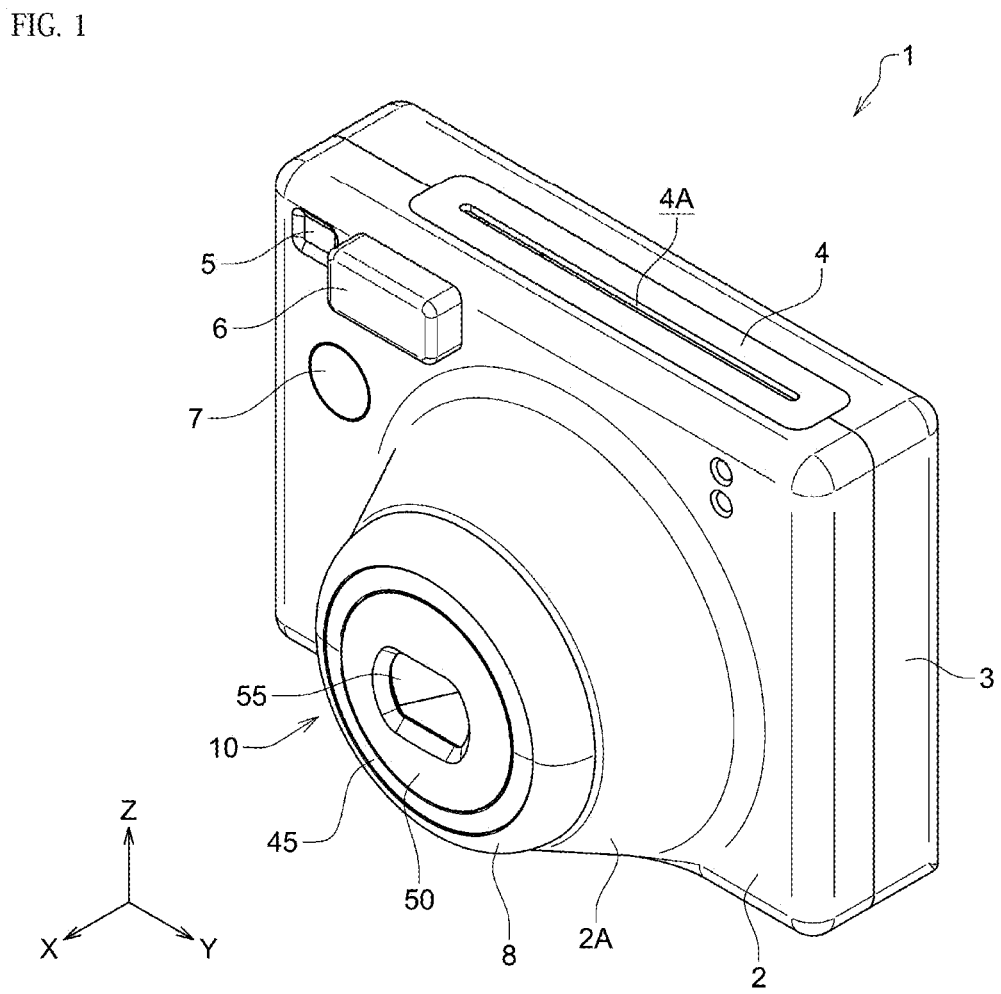
FIG. 1 is a perspective view of a camera according to one embodiment of the present invention.

A camera according to one or more embodiments of the present invention will now be described in detail with reference to FIGS. 1 to 9. In FIGS. 1 to 9, like reference numerals denote like or corresponding components. Such components will not be described repeatedly. In FIGS. 1 to 9, the scale and dimensions of each component may be exaggerated, or one or more components may not be shown. Unless otherwise specified, the terms such as first and second will be used simply to distinguish the components and will not represent a specific order or sequence.

FIG. 1 is a perspective view of a camera 1 according to one embodiment of the present invention. Although the camera 1 according to the present embodiment is a camera (instant camera) that uses a photographic film to be automatically developed after photographing, the present invention is also applicable to a camera other than such an instant camera. In the present embodiment, for ease of explanation, the term front or forward refers to the positive X-direction in FIG. 1, and the term rear or backward refers to the negative X-direction in FIG. 1.

As shown in FIG. 1, the camera 1 includes a front cover 2, a rear cover 3 attached to the rear of the front cover 2, a top cover 4 held between the front cover 2 and the rear cover 3, a lens barrel 10 accommodated in a cylindrical portion 2A of the front cover 2, and an operation ring 8 rotatable relative to the cylindrical portion 2A of the front cover 2. The front cover 2 includes a viewfinder 5. A flash window 6 is located adjacent to the viewfinder 5. A release button 7 is located in the negative Z-direction from the viewfinder 5. The top cover 4 has an ejection slit 4A extending in Y-direction, through which a photographic film developed after photographing is ejected.

Figure 2:
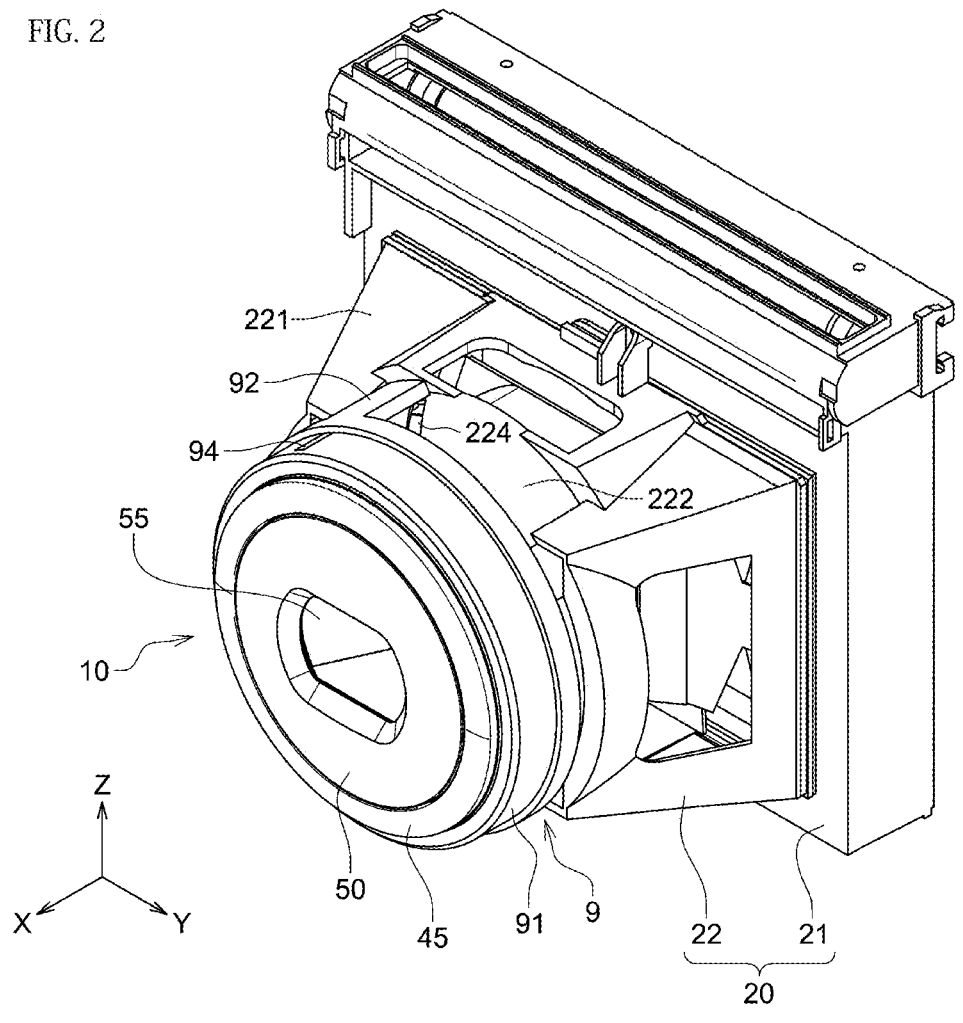
FIG. 2 is a perspective view of some of the components of the camera shown in FIG. 1 accommodated in an internal space defined by a front cover, a rear cover, and a top cover.
Figure 3:
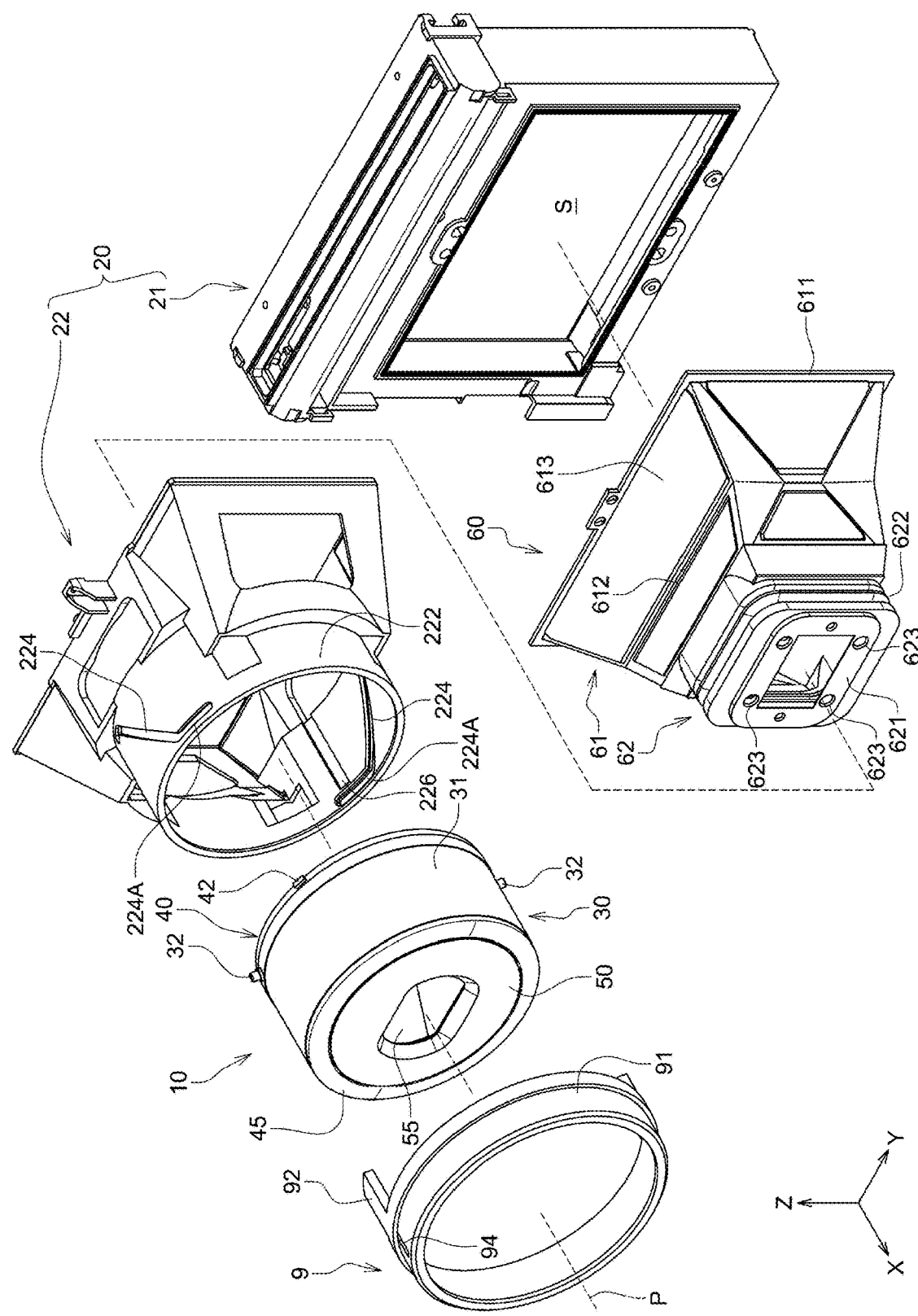
FIG. 3 is an exploded perspective view of the components shown in FIG. 2.

FIG. 2 is an exploded perspective view of some of the components of the camera shown in FIG. 1 accommodated in an internal space defined by the front cover 2, the rear cover 3, and the top cover 4. FIG. 3 is an exploded perspective view of the components shown in FIG. 2. As shown in FIGS. 2 and 3, the camera 1 includes a frame 20 including a film compartment 21 and a cylindrical barrel portion 22. The film compartment 21 has an accommodating space S to contain a photographic film. The barrel portion 22 is attached to the front (positive X-direction) of the film compartment 21. The barrel portion 22 is attached to the front of the film compartment 21 with screws (not shown) to form the frame 20. The barrel portion 22 attached to the film compartment 21 (FIG. 2) extends forward (positive X-direction) from the film compartment 21 and holds the lens barrel 10 inside.

As shown in FIGS. 2 and 3, the barrel portion 22 includes a base 221 being a rectangular frustum fixed to the film compartment 21 and a cylindrical wall 222 extending forward (positive X-direction) from the base 221. The cylindrical wall 222 has two through-cam slits 224 extending through the cylindrical wall 222. The two through-cam slits 224 are located at intervals of 180 degrees in the circumferential direction. An intermediate portion of each through-cam slit 224 extends with its circumferential position gradually changing from its rear end toward its front end 224A. The cylindrical wall 222 of the barrel portion 22 has, on its inner circumferential surface, two axial grooves 226 extending in the axial direction (X-direction).

The camera 1 also includes a drive cylinder 9 that is engaged with the operation ring 8 and rotates integrally with the operation ring 8. The drive cylinder 9 is rotatable relative to the barrel portion 22 without moving in the axial direction relative to the barrel portion 22. The drive cylinder 9 includes a cylindrical portion 91 extending in the axial direction (X-direction) and two extending portions 92 extending backward from the cylindrical portion 91. The cylindrical portion 91 is located radially outward from the barrel portion 22 on its front edge. The two extending portions 92 face each other across the optical axis P. The cylindrical portion 91 and the extending portions 92 have, on their inner circumferential surfaces, axial slits 94 extending in the axial direction (X-direction).

Figure 4:
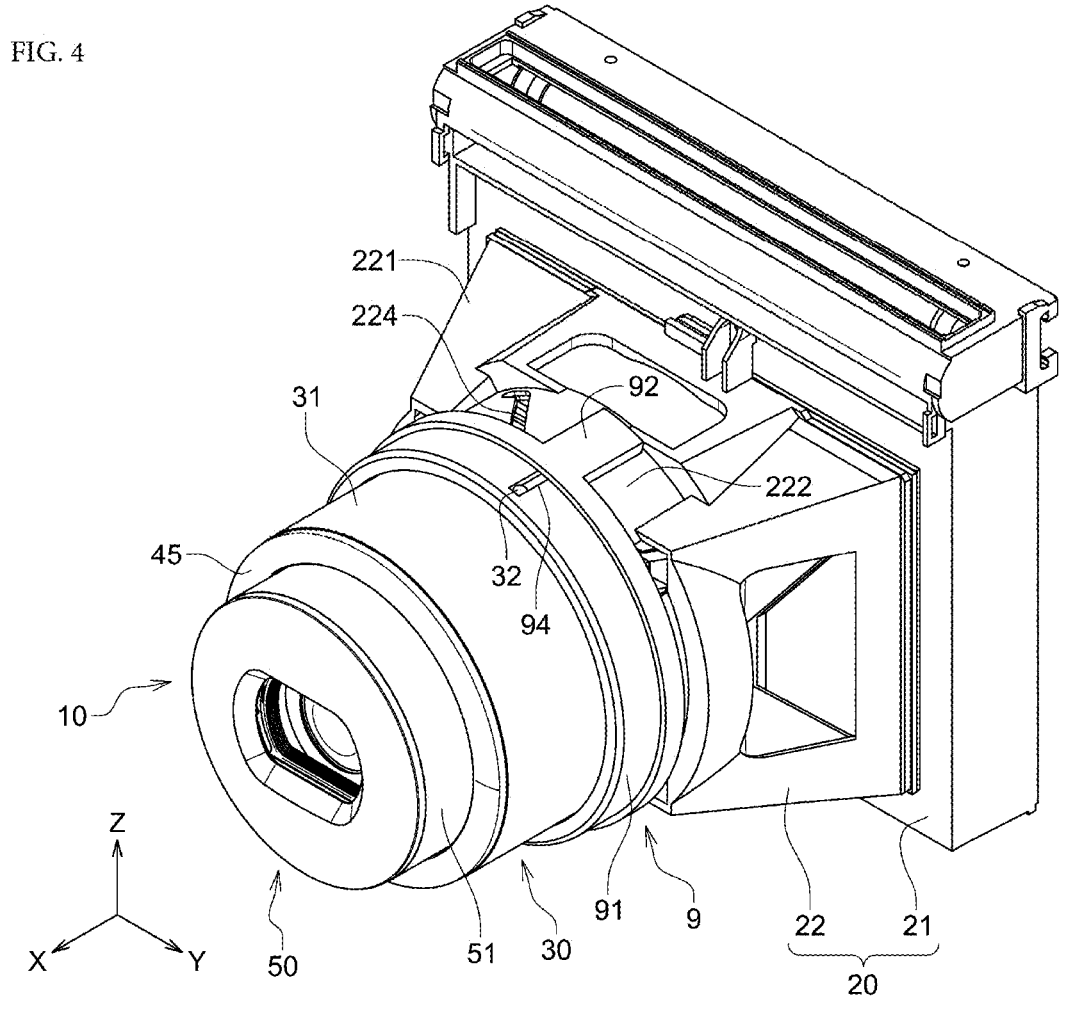
FIG. 4 is a perspective view of a lens barrel shown in FIG. 2 in a first photographing state.
Figure 5:
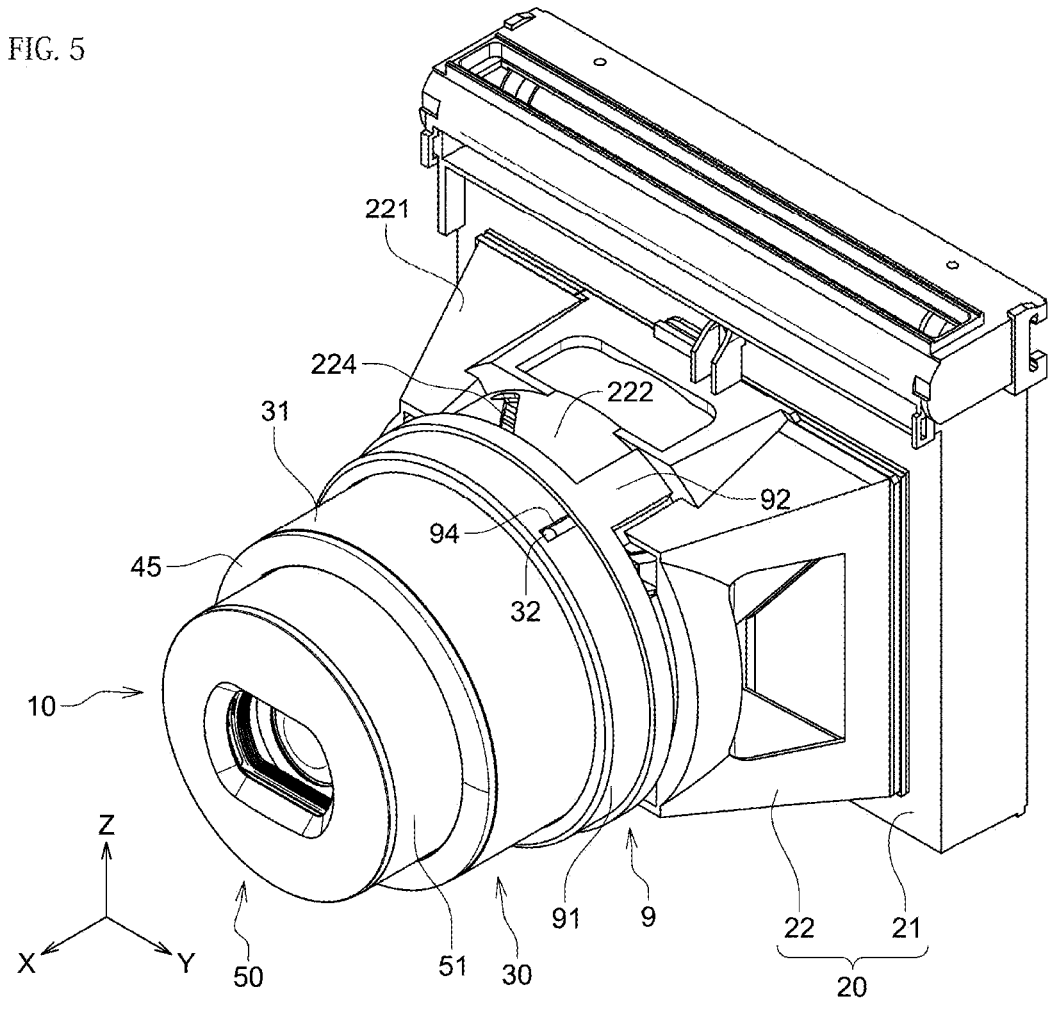
FIG. 5 is a perspective view of the lens barrel shown in FIG. 2 in a second photographing state.

The lens barrel 10 in the present embodiment is extendable in the direction along the optical axis P (positive X-direction). The lens barrel 10 shown in FIGS. 1 and 2 is retracted to its minimum length in the direction along the optical axis P (X-direction). The state of the camera 1 with the lens barrel 10 in the state shown in FIG. 1 is referred to as a retracted state of the camera 1. FIG. 4 is a perspective view of the lens barrel 10 extending in the positive X-direction from the state shown in FIG. 2. In this state, the user can perform normal photographing. This state is hereafter referred to as a first photographing state. FIG. 5 is a perspective view of the lens barrel 10 extending in the positive X-direction further from the state shown in FIG. 4. In FIG. 5, the lens barrel 10 extends to its maximum length in the positive X-direction. In this state, the user can perform, for example, short-distance macrophotographing. This state is hereafter referred to as a second photographing state.

Figure 6:
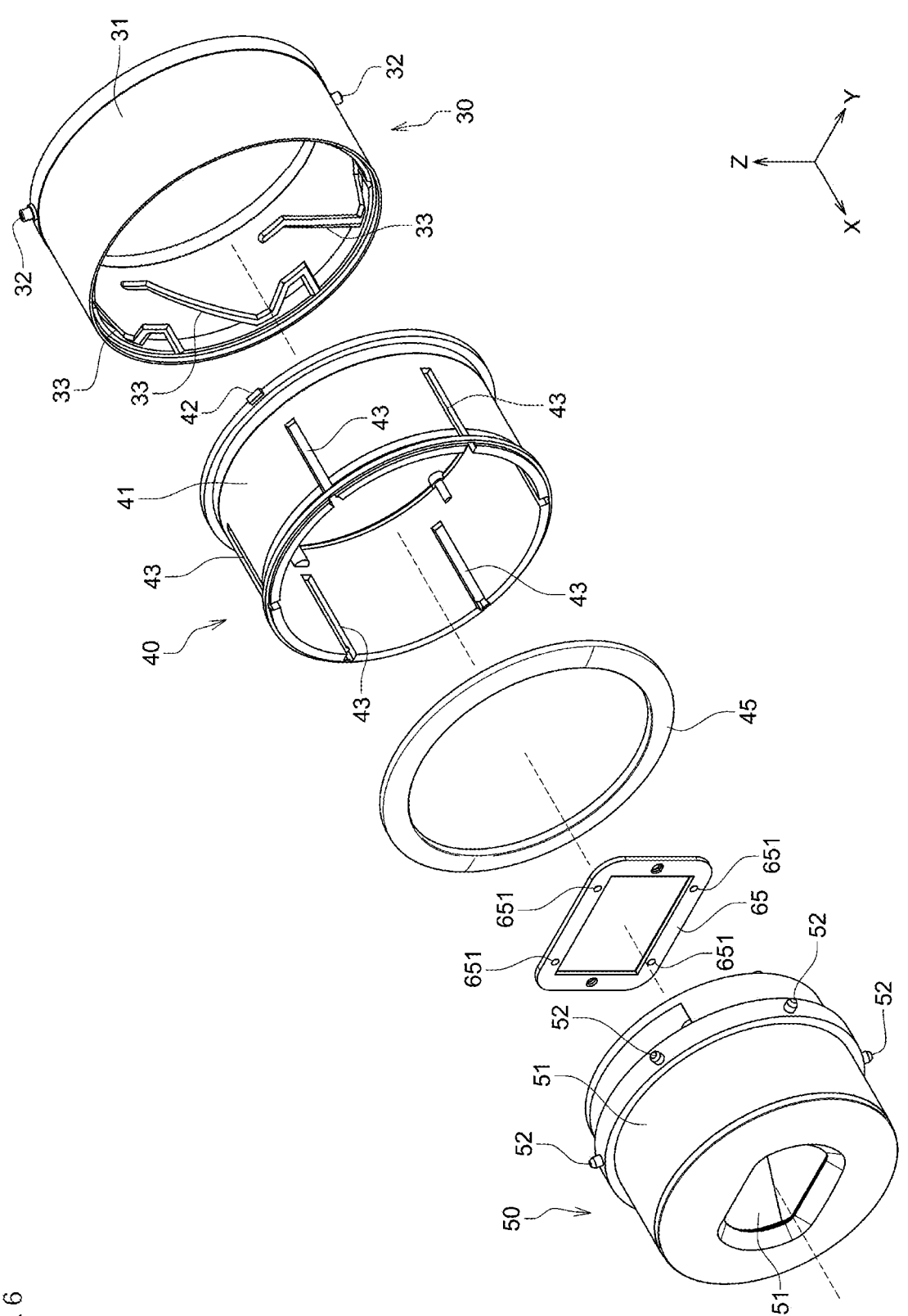
FIG. 6 is an exploded perspective view of the lens barrel shown in FIG. 3.
Figure 7:
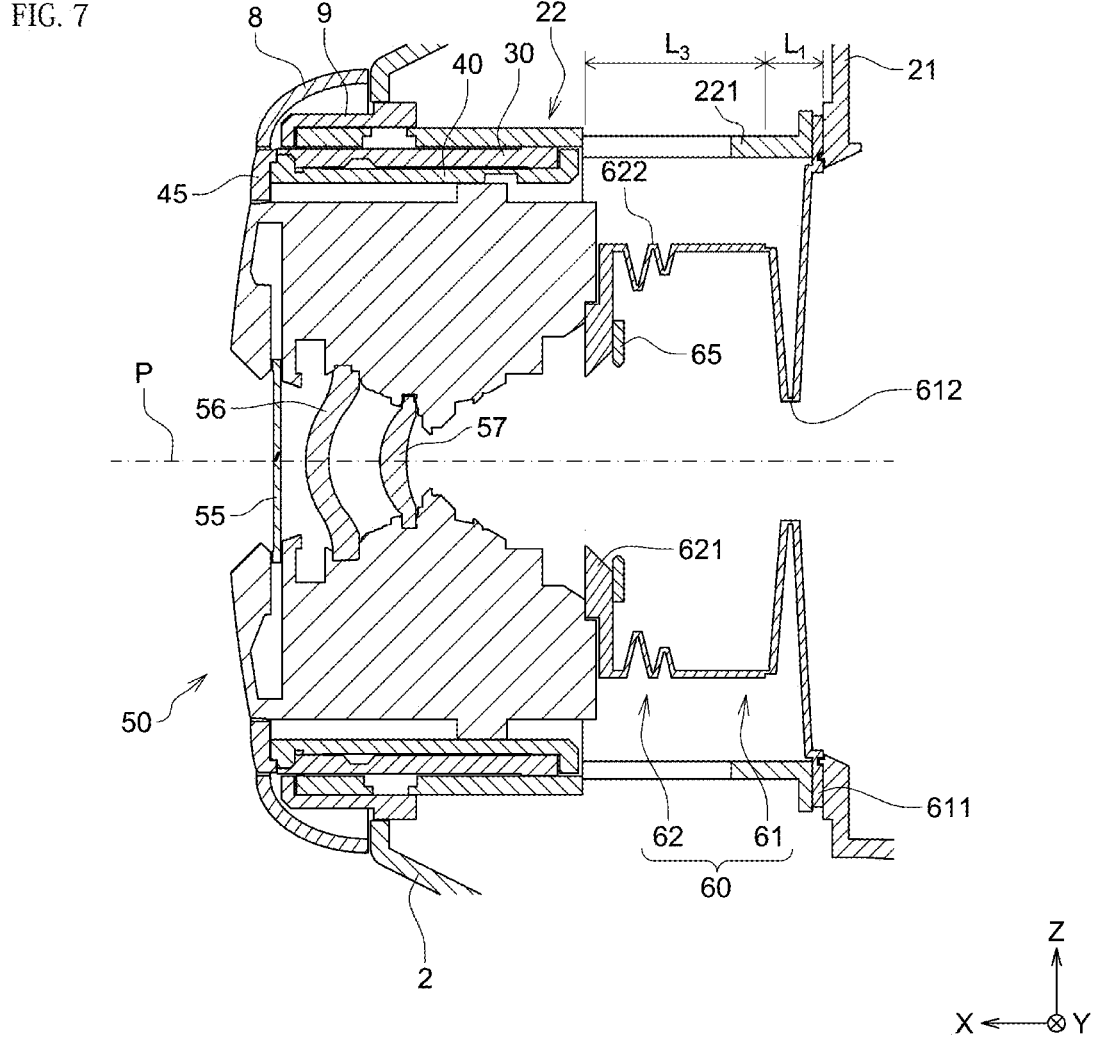
FIG. 7 is a longitudinal sectional view of the camera in FIG. 1 in a retracted state.

FIG. 6 is an exploded perspective view of the lens barrel 10. FIG. 7 is a longitudinal sectional view of the camera 1 in the retracted state. As shown in FIGS. 6 and 7, the lens barrel 10 in the present embodiment includes a rotary cylinder 30, a key cylinder 40, a cover ring 45, and a linearly movable cylinder 50. The rotary cylinder 30 is rotatable relative to the barrel portion 22 and movable in the axial direction. The key cylinder 40 is movable in the axial direction together with the rotary cylinder 30 without rotating relative to the barrel portion 22. The cover ring 45 is attached to the front edge of the key cylinder 40. The linearly movable cylinder 50 is rotatable relative to the barrel portion 22 together with the key cylinder 40.

In the present embodiment, the rotary cylinder 30, the key cylinder 40, and the cover ring 45 together serve as a rear lens barrel unit accommodated radially inside the barrel portion 22 and movable forward (positive X-direction) relative to the barrel portion 22. The linearly movable cylinder 50 serves as a front lens barrel unit accommodated radially inside the rotary cylinder 30 and the key cylinder 40 and movable forward (positive X-direction) relative to the rotary cylinder 30 and the key cylinder 40. In the present embodiment, as shown in FIG. 7, the linearly movable cylinder 50 serving as the front lens barrel unit accommodates a lens unit including a barrier 55 that can be open and closed, a first lens 56, and a second lens 57. The number of lenses in the lens unit is not limited to the number shown in the figure.

As shown in FIG. 6, the rotary cylinder 30 is rotatable and movable in the axial direction relative to the barrel portion 22. The rotary cylinder 30 includes a cylindrical portion 31 extending in the axial direction (X-direction) and located radially inside the barrel portion 22 and two actuation portions 32 protruding radially outward near the rear end of the cylindrical portion 31. Each actuation portion 32 has an outer diameter slightly smaller than the width of the corresponding through-cam slit 224 in the cylindrical wall 222 of the barrel portion 22 and the circumferential width of the corresponding axial slit 94 in the drive cylinder 9. Each actuation portion 32 is thus engaged with the corresponding axial slit 94 in the drive cylinder 9 through the corresponding through-cam slit 224 in the barrel portion 22.

In this structure, the actuation portions 32 of the rotary cylinder 30 are movable inside and along the corresponding through-cam slits 224 in the barrel portion 22 while being engaged with the through-cam slits 224 in the barrel portion 22 and also movable in the axial direction along the corresponding axial slits 94 in the drive cylinder 9 while being engaged with the axial slits 94 in the drive cylinder 9. When the drive cylinder 9 rotates relative to the barrel portion 22, the rotary cylinder 30 with its actuation portions 32 engaged with the corresponding axial slits 94 in the drive cylinder 9 rotates relative to the barrel portion 22 together with the drive cylinder 9. The rotary cylinder 30 with its actuation portions 32 engaged with the corresponding through-cam slits 224 in the barrel portion 22 also moves in X-direction relative to the barrel portion 22 along the shapes of the through-cam slits 224 as the rotary cylinder 30 rotates. In this manner, when the drive cylinder 9 rotates relative to the barrel portion 22, the rotary cylinder 30 rotates relative to the barrel portion 22 and also extends in the positive X-direction.

As shown in FIG. 6, the cylindrical portion 31 of the rotary cylinder 30 has, on its inner circumferential surface, six cam grooves 33 extending with their circumferential positions gradually changing from their rear ends toward their front ends. The six cam grooves 33 are located at intervals of 60 degrees about the axis.

The key cylinder 40 includes a cylindrical portion 41 extending in the axial direction (X-direction) and engagement portions 42 protruding radially outward from the rear edge of the cylindrical portion 41. The cylindrical portion 41 of the key cylinder 40 is located radially inside the cylindrical portion 31 of the rotary cylinder 30. The cylindrical portion 41 of the key cylinder 40 has six axial slits 43 extending in the axial direction (X-direction) through the cylindrical portion 41. The six axial slits 43 are all located at intervals of 60 degrees in the circumferential direction. The key cylinder 40 can rotate relative to the rotary cylinder 30 without changing its axial position relative to the rotary cylinder 30.

Each engagement portion 42 of the key cylinder 40 has a width slightly smaller than the width of the corresponding axial groove 226 on the barrel portion 22. Each engagement portion 42 is thus engaged with the corresponding axial groove 226 on the barrel portion 22 and movable along the axial groove 226 in the axial direction. The key cylinder 40 thus does not rotate relative to the barrel portion 22, but can move in the axial direction together with the rotary cylinder 30 while rotating relative to the rotary cylinder 30.

The linearly movable cylinder 50 includes a cylindrical portion 51 located radially inside the key cylinder 40 and six cylindrical actuation portions 52 protruding radially outward from its outer circumferential surface. The actuation portions 52 are located at equal intervals in the circumferential direction. Each actuation portion 52 has an outer diameter slightly smaller than the circumferential width of the corresponding axial slit 43 in the key cylinder 40 and the circumferential width of the corresponding cam groove 33 on the rotary cylinder 30. Each actuation portion 52 is thus engaged with the corresponding cam groove 33 on the rotary cylinder 30 through the corresponding axial slit 43 in the key cylinder 40.

The key cylinder 40 does not rotate relative to the barrel portion 22 with the engagement between the engagement portions 42 and the axial grooves 226 on the barrel portion 22. In contrast, the rotary cylinder 30 is rotatable relative to the barrel portion 22. Thus, when the rotary cylinder 30 rotates relative to the barrel portion 22, the linearly movable cylinder 50 with its actuation portions 52 engaged with the corresponding cam grooves 33 on the rotary cylinder 30 moves in X-direction relative to the rotary cylinder 30 along the shapes of the cam grooves 33. In this manner, the linearly movable cylinder 50 can extend in the positive X-direction from the rotary cylinder 30 as the rotary cylinder 30 rotates relative to the barrel portion 22. The cover ring 45 is attached to the front edge of the key cylinder 40 to cover the front edges of the key cylinder 40 and the rotary cylinder 30.

When the user rotates the operation ring 8 relative to the cylindrical portion 2A of the front cover 2 in the retracted state of the camera 1 with the above structure shown in FIG. 1, the drive cylinder 9 rotates integrally with the operation ring 8. This causes the rotary cylinder 30 with its actuation portions 32 engaged with the corresponding axial slits 94 in the drive cylinder 9 as well as with the corresponding through-cam slits 224 in the barrel portion 22 to rotate integrally with the drive cylinder 9 and also to move in the axial direction along the shapes of the through-cam slits 224 in the barrel portion 22. This causes the linearly movable cylinder 50 with its actuation portions 52 engaged with the corresponding axial slits 43 in the key cylinder 40 as well as with the corresponding cam grooves 33 on the rotary cylinder 30 to move in the axial direction along the shapes of the cam grooves 33 on the rotary cylinder 30 without rotating relative to the barrel portion 22. In this manner, both the rotary cylinder 30 and the linearly movable cylinder 50 in the lens barrel 10 can extend in the axial direction.

Referring back to FIG. 3, the front end 224A of each through-cam slit 224 in the barrel portion 22 extends in the circumferential direction at the same axial position. In the first photographing state, the actuation portions 32 of the rotary cylinder 30 are at the front ends 224A of the through-cam slits 224. Thus, when the rotary cylinder 30 rotates to shift from the first photographing state to the second photographing state, the rotary cylinder 30 does not extend further in the axial direction, but the linearly movable cylinder 50 alone extends in the axial direction.

As shown in FIG. 3, the camera 1 according to the present embodiment includes a light shield 60 that blocks light outside the lens barrel 10 from entering an optical path in the lens barrel 10. The light shield 60 has an internal space gradually enlarging in the negative X-direction. The light shield 60 is located between the rear end of the linearly movable cylinder 50 and the film compartment 21 in the frame 20. The light shield 60 includes a rear extendable portion 61 connected to the frame 20 and a front extendable portion 62 connected to the linearly movable cylinder 50. The rear extendable portion 61 and the front extendable portion 62 are formed integrally from, for example, a flexible material such as silicone rubber and are extendable as the linearly movable cylinder 50 moves relative to the frame 20. The light shield 60 connects the rear end of the linearly movable cylinder 50 and the film compartment 21 in the frame 20. This structure blocks light outside the lens barrel 10 from entering the optical path between the rear end of the linearly movable cylinder 50 and the film compartment 21 in the frame 20.

As shown in FIG. 7, the rear extendable portion 61 in the light shield 60 includes a fixed portion 611 fixed between the film compartment 21 in the frame 20 and the rear end of the barrel portion 22, and a foldable portion 613 foldable along a valley 612. In the state shown in FIG. 7, with the foldable portion 613 folded along the valley 612, the rear extendable portion 61 contracts in the direction along the optical axis P to a length $L_1$ in the direction along the optical axis P. The rear extendable portion 61 in the folded state is unfolded to extend in the direction along the optical axis P.

The front extendable portion 62 includes a connector 621 being a rectangular frame fixed to the rear end of the linearly movable cylinder 50 and a cylindrical bellows 622 connecting the connector 621 and the foldable portion 613 of the rear extendable portion 61 in an extendable manner. In the state shown in FIG. 7, with the bellows 622 contracting in the direction along the optical axis P, the front extendable portion 62 has a length $L_3$ in the direction along the optical axis P. Unlike the foldable portion 613 of the rear extendable portion 61, the bellows 622 in the front extendable portion 62 are extendable in the direction along the optical axis P but do not substantially either extend or contract in the direction perpendicular to the optical axis P.

The connector 621 in the front extendable portion 62 in the light shield 60 has multiple threaded holes 623. An attachment plate 65 (refer to FIG. 6) being a rectangular frame is located behind (negative X-direction) the connector 621 in the front extendable portion 62. The attachment plate 65 has threaded holes 651 corresponding to the threaded holes 623 in the connector 621 in the front extendable portion 62 in the light shield 60. Screws are screwed into the threaded holes 651 in the attachment plate 65, the threaded holes 623 in the connector 621 in the front extendable portion 62, and the threaded holes (not shown) in the rear end of the linearly movable cylinder 50 to hold the connector 621 in the front extendable portion 62 in the light shield 60 between the attachment plate 65 and the rear end of the linearly movable cylinder 50.

In the retracted state shown in FIG. 7, the rotary cylinder 30 and the linearly movable cylinder 50 in the lens barrel 10 are accommodated radially inside the barrel portion 22. The linearly movable cylinder 50 is at its farthest in the negative X-direction. The light shield 60 is retracted to its minimum length in X-direction. In other words, the rear extendable portion 61 in the light shield 60 contracts in X-direction with the foldable portion 613 folded along the valley 612, and the bellows 622 in the front extendable portion 62 contracts in X-direction. In this state, photographing with the camera 1 is not performed.

Figure 8:
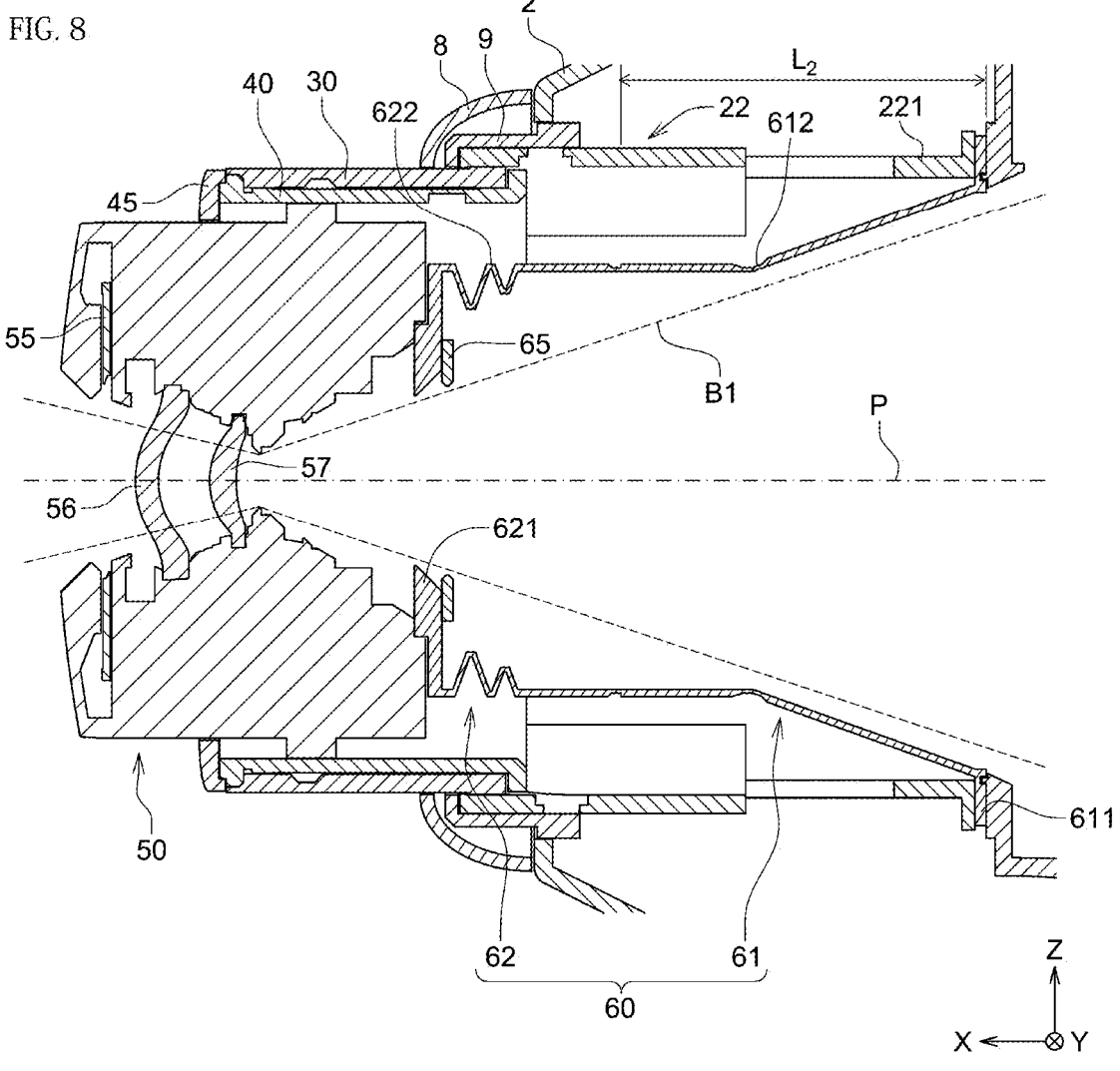
FIG. 8 is a longitudinal sectional view of the camera in FIG. 1 in the first photographing state.

As described above, when the user rotates the operation ring 8 in the retracted state shown in FIG. 7, the rotary cylinder 30 and the linearly movable cylinder 50 in the lens barrel 10 extend forward (positive X-direction) to be in the first photographing state shown in FIG. 8. In the first photographing state, the linearly movable cylinder 50 in the lens barrel 10 extends in the positive X-direction relative to the frame 20, causing the foldable portion 613 of the rear extendable portion 61 in the light shield 60 to unfold from the folded state and extend in the positive X-direction. At this time, the rear extendable portion 61 has a length $L_2$ in the direction along the optical axis P. In the first photographing state in the present embodiment, the rear extendable portion 61 in the light shield 60 extends to its maximum length in the positive X-direction. The bellows 622 in the front extendable portion 62 also extends in the positive X-direction. The length of the front extendable portion 62 in the direction along the optical axis P may be not less than its equilibrium length, or may be less than its equilibrium length. In the first photographing state, the user can perform normal photographing. In this state, as shown in FIG. 8, both the rear extendable portion 61 and the front extendable portion 62 in the light shield 60 are outside a light beam B1 projected from the lens unit in the linearly movable cylinder 50 onto the photographic film to avoid being included in an image projected onto the photographic film.

Figure 9:
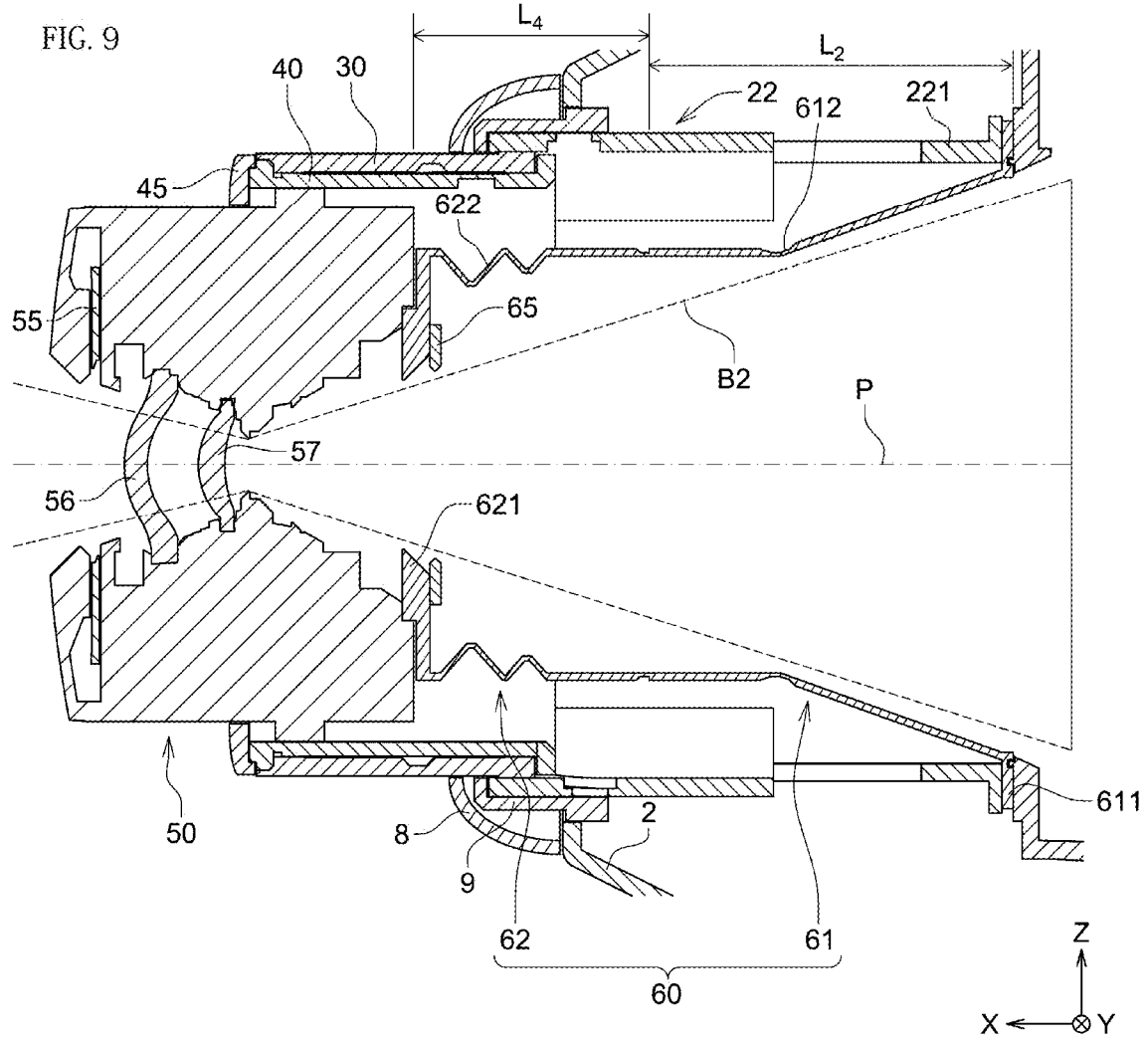
FIG. 9 is a longitudinal sectional view of the camera in FIG. 1 in the second photographing state.

When the user rotates the operation ring 8 further from the first photographing state shown in FIG. 8, the linearly movable cylinder 50 in the lens barrel 10 extends forward (positive X-direction) to be in the second photographing state shown in FIG. 9. In the first photographing state, as described above, the rear extendable portion 61 in the light shield 60 extends to its maximum length in the positive X-direction and cannot extend further. Thus, the length of the rear extendable portion 61 in the direction along the optical axis P remains to be the length $L_2$. When shifting from the first photographing state to the second photographing state, the bellows 622 in the front extendable portion 62 in the light shield 60 extends in the positive X-direction, causing a length $L_4$ of the front extendable portion 62 in the direction along the optical axis P to be not less than its equilibrium length. In the second photographing state, the user can perform, for example, short-distance macro photographing. In this state, as shown in FIG. 9, both the rear extendable portion 61 and the front extendable portion 62 in the light shield 60 are outside a light beam B2 projected from the lens unit in the linearly movable cylinder 50 onto the photographic film to avoid being included in an image projected onto the photographic film (not shown).

In the present embodiment, as described above, the light shield 60 blocks light outside the lens barrel 10 from entering the optical path in the lens barrel 10 both in the first photographing state and in the second photographing state. In the present embodiment, the rear extendable portion 61 and the front extendable portion 62 are integral as the light shield 60. Thus, the connection between the rear extendable portion 61 and the front extendable portion 62 in the light shield 60 may not be fixed to the rotary cylinder 30 or the key cylinder 40 in the lens barrel 10. More specifically, in any of the retracted state shown in FIG. 7, the first photographing state shown in FIG. 8, or the second photographing state shown in FIG. 9, the light shield 60 is not in contact with either the rotary cylinder 30 or the key cylinder 40, and is separate from the rotary cylinder 30 and the key cylinder 40. In the present embodiment, no fastener is used to fix the connection between the rear extendable portion 61 and the front extendable portion 62 to the rotary cylinder 30 or the key cylinder 40 in the lens barrel 10. The camera 1 includes fewer parts and thus reduces the manufacturing cost.

In addition, when the linearly movable cylinder 50 extends forward from the first photographing state relative to the rotary cylinder 30 and the key cylinder 40 to be in the second photographing state, the length of the rear extendable portion 61 in the light shield 60 in the direction along the optical axis P remains to be the length $L_2$, but the front extendable portion 62 extends to the length $L_4$ that is not less than the equilibrium length of the light shield 60. Thus, the front extendable portion 62 may neither extend nor contract in a direction perpendicular to the optical axis P. This allows the front extendable portion 62 to use the bellows 622 that are extendable in the direction along the optical axis P alone. Thus, downsizing the camera 1 is less likely to cause the front extendable portion 62 to be included in an image projected onto the photographic film and is less likely to cause vignetting.

The camera 1 according to the present embodiment with a simple and inexpensive structure allows the user to perform photographing in two different modes (e.g., normal photographing and macro photographing) with the lens at different positions while preventing entry of light and dust and thus less vignetting.

In the above embodiment, the rear lens barrel unit includes the rotary cylinder 30, the key cylinder 40, and the cover ring 45 in the lens barrel 10. The linearly movable cylinder 50 serves as the front lens barrel unit in the lens barrel 10. However, the lens barrel units are not limited to these structures.

The terms front, forward, rear, backward, up, upward, down, downward, and other terms used herein to indicate the positional relationships are used in connection with the illustrated embodiment and are thus changeable depending on the relative positional relationship in the device.

As described above, a camera according to one aspect of the present invention with a simple and inexpensive structure reduces the likelihood of vignetting while preventing entry of light and dust.

First Structure

A camera includes a frame including a film compartment to contain a photographic film and a barrel portion extending from the film compartment in an optical axis direction, and a lens barrel movable in the optical axis direction inside the barrel portion. The lens barrel includes a rear lens barrel unit movable forward relative to the barrel portion from a position radially inside the barrel portion and a front lens barrel unit movable forward relative to the rear lens barrel unit from a position radially inside the rear lens barrel unit. The front lens barrel unit accommodates at least one lens. The camera further includes a light shield separate from the rear lens barrel unit and connecting the frame and the front lens barrel unit. The light shield includes a rear extendable portion connected to the frame and extendable from a contracting state in the optical axis direction, and a front extendable portion connected to the front lens barrel unit and extendable from a contracting state in the optical axis direction to be longer than an equilibrium length of the front extendable portion. The lens barrel is shiftable between a retracted state in which the rear lens barrel unit is accommodated radially inside the barrel portion and the front lens barrel unit is accommodated radially inside the rear lens barrel unit, a first photographing state in which the rear lens barrel unit extends forward relative to the barrel portion and the front lens barrel unit is accommodated radially inside the rear lens barrel unit, and a second photographing state in which the rear lens barrel unit extends forward relative to the barrel portion and the front lens barrel unit extends forward relative to the rear lens barrel unit. The rear extendable portion in the light shield contracts in the optical axis direction to have a first length in the optical axis direction in the retracted state and has a second length greater than the first length in the optical axis direction in the first photographing state and the second photographing state. The front extendable portion in the light shield contracts in the optical axis direction to have a third length in the optical axis direction in the retracted state and has a fourth length greater than the third length and greater than or equal to the equilibrium length in the optical axis direction in the second photographing state.

In this structure, the light shield blocks light outside the lens barrel from entering an optical path in the lens barrel both in the first photographing state and in the second photographing state. In addition, the rear extendable portion and the front extendable portion are integral as the light shield. Thus, the connection between the rear extendable portion and the front extendable portion in the light shield may not be fixed to a movable part of the lens barrel. No fastener is used to fix the connection between the rear extendable portion and the front extendable portion to the movable part of the lens barrel. The camera thus includes fewer parts and thus reduces the manufacturing cost. In addition, when the front lens barrel unit extends forward from the first photographing state relative to the rear lens barrel unit to be in the second photographing state, the length of the rear extendable portion in the light shield in the direction along the optical axis remains unchanged, with the front extendable portion extending to a length not less than the equilibrium length. Thus, the front extendable portion may neither extend nor contract in a direction perpendicular to the optical axis. This allows the camera to be downsized with the front extendable portion being less likely to be included in an image projected onto the photographic film, thus with less vignetting. The camera according to one or more aspects of the present invention with a simple and inexpensive structure thus allows the user to perform photographing in two different modes (e.g., normal photographing and macro photographing) with the lens at different positions while preventing entry of light and dust and thus with less vignetting.

Second Structure

In the camera according to the first structure, in the first photographing state and the second photographing state, the rear extendable portion and the front extendable portion may be located outside a light beam projected from the at least one lens onto the photographic film.

Third Structure

In the camera according to the first structure or the second structure, the rear extendable portion in the light shield may contract in the optical axis direction when folded and may extend in the optical axis direction when unfolded from a folded state.

Fourth Structure

In the camera according to any one of the first to third structures, the front extendable portion in the light shield may include a cylindrical bellows extendable in the optical axis direction.

Fifth Structure

The camera according to any one of the first to fourth structures may further include an attachment plate attaching the front extendable portion in the light shield to the front lens barrel unit.

Sixth Structure

The camera according to any one of the first to fifth structures may further include a drive cylinder that drives the rear lens barrel unit and the front lens barrel unit in the lens barrel. The drive cylinder may be rotatable relative to the barrel portion without moving in the optical axis direction.

Although the embodiments of the present invention have been described above, the present invention is not limited to the above embodiments and may be modified variously within the scope of its technical idea.

What is claimed is:

1. A camera, comprising:
   a frame including a film compartment to contain a photographic film and a barrel portion extending from the film compartment in an optical axis direction;
   a lens barrel movable in the optical axis direction inside the barrel portion, the lens barrel including
      a rear lens barrel unit movable forward relative to the barrel portion from a position radially inside the barrel portion, and
      a front lens barrel unit movable forward relative to the rear lens barrel unit from a position radially inside the rear lens barrel unit, the front lens barrel unit accommodating at least one lens; and
   a light shield separate from the rear lens barrel unit and connecting the frame and the front lens barrel unit, the light shield including
      a rear extendable portion connected to the frame and extendable from a contracting state in the optical axis direction, and a front extendable portion connected to the front lens
barrel unit and extendable from a contracting state in
the optical axis direction to be longer than an equi-
librium length of the front extendable portion,
wherein the front extendable portion is integral with
the rear extendable portion, wherein the lens barrel is shiftable between a retracted state in which the rear lens barrel unit is
accommodated radially inside the barrel portion and
the front lens barrel unit is accommodated radially
inside the rear lens barrel unit, a first photographing state in which the rear lens barrel
unit extends forward relative to the barrel portion
and the front lens barrel unit is accommodated
radially inside the rear lens barrel unit, and a second photographing state in which the rear lens
barrel unit extends forward relative to the barrel
portion and the front lens barrel unit extends forward
relative to the rear lens barrel unit, the rear extendable portion in the light shield contracts in
the optical axis direction to have a first length in the
optical axis direction in the retracted state and has a
second length greater than the first length in the optical
axis direction in the first photographing state and the
second photographing state, and the front extendable portion in the light shield contracts in
the optical axis direction to have a third length in the
optical axis direction in the retracted state and has a fourth length greater than the third length and greater
than or equal to the equilibrium length in the optical
axis direction in the second photographing state.

2. The camera according to claim 1, wherein in the first photographing state and the second photo-
graphing state, the rear extendable portion and the front
extendable portion are located outside a light beam
projected from the at least one lens onto the photo-
graphic film.

3. The camera according to claim 1, wherein the rear extendable portion in the light shield contracts in
the optical axis direction when folded and extends in
the optical axis direction when unfolded from a folded
state.

4. The camera according to claim 1, wherein the front extendable portion in the light shield includes a
cylindrical bellows extendable in the optical axis direc-
tion.

5. The camera according to claim 1, further comprising:

an attachment plate attaching the front extendable portion
in the light shield to the front lens barrel unit.

6. The camera according to claim 1, further comprising:

a drive cylinder configured to drive the rear lens barrel
unit and the front lens barrel unit in the lens barrel, the
drive cylinder being rotatable relative to the barrel
portion without moving in the optical axis direction.

* * * * *